United States Patent Office 3,262,055
Patented July 19, 1966

3,262,055
TRUE R.M.S. VOLTMETER HAVING TIME-SHARED STABILIZING FEEDBACK CIRCUITS UTILIZING A THERMOCOUPLE INPUT AND PHOTOELECTRIC MODULATOR-DEMODULATOR AMPLIFIER
Gregory Justice, Mountain View, Calif., assignor to Hewlett-Packard Company, Palo Alto, Calif., a corporation of California
Filed Aug. 20, 1962, Ser. No. 217,832
4 Claims. (Cl. 324—106)

This invention relates to a meter circuit which provides a linear indication of the true root-mean-square value of a complex waveform.

The effective value of a complex waveform is commonly of interest in making circuit measurements because of the simple relationship which it bears to the resulting circuit power. The effective value of any waveform is calculated by squaring the function defining the waveform, obtaining the average of the squared function and taking the square root of the average. The effective value thus obtained is also called the root-means-square (R.M.S.) value. Several devices for measuring the effective or R.M.S. value of a waveform are suggested in the literature (see Analysis of A.C. Circuits, W. R. Lepage, McGraw-Hill Company, New York, 1952, pages 59–60). One disadvantage inherent in these devices is the fact that the indicating meters have nonlinear scales. This makes it extremely difficult to obtain accurate meter readings on the portion of the scale that is compressed. Also, these devices respond to changes in ambient temperature and thus must be calibrated for zero deflection with no voltage applied before each measurement is taken.

It is therefore a principal object of the present invention to provide a true R.M.S.-sensing voltmeter which operates at very high frequencies and which provides a linear indication of the effective value of an applied complex waveform.

It is another object of the present invention to provide a true R.M.S.-sensing voltmeter which provides accurate readings of the effective value of applied complex waveforms over a wide range of ambient temperatures.

In accordance with the illustrated embodiment of the present invention a pair of thermocouples are serially connected to the input of a D.C. amplifier. The waveform under examination is applied through a wideband amplifier to the heater of one thermocouple and the output signal of the D.C. amplifier is applied to the heater of the other thermocouple. An indicating meter is connected to receive the signal applied to the heater of the other thermocouple. The thermocouples are connected in voltage bucking relationship and thus changes in the voltages produced by each as a result of a change in the ambient temperature are cancelled out leaving the meter indication unaffected.

Figure 1:
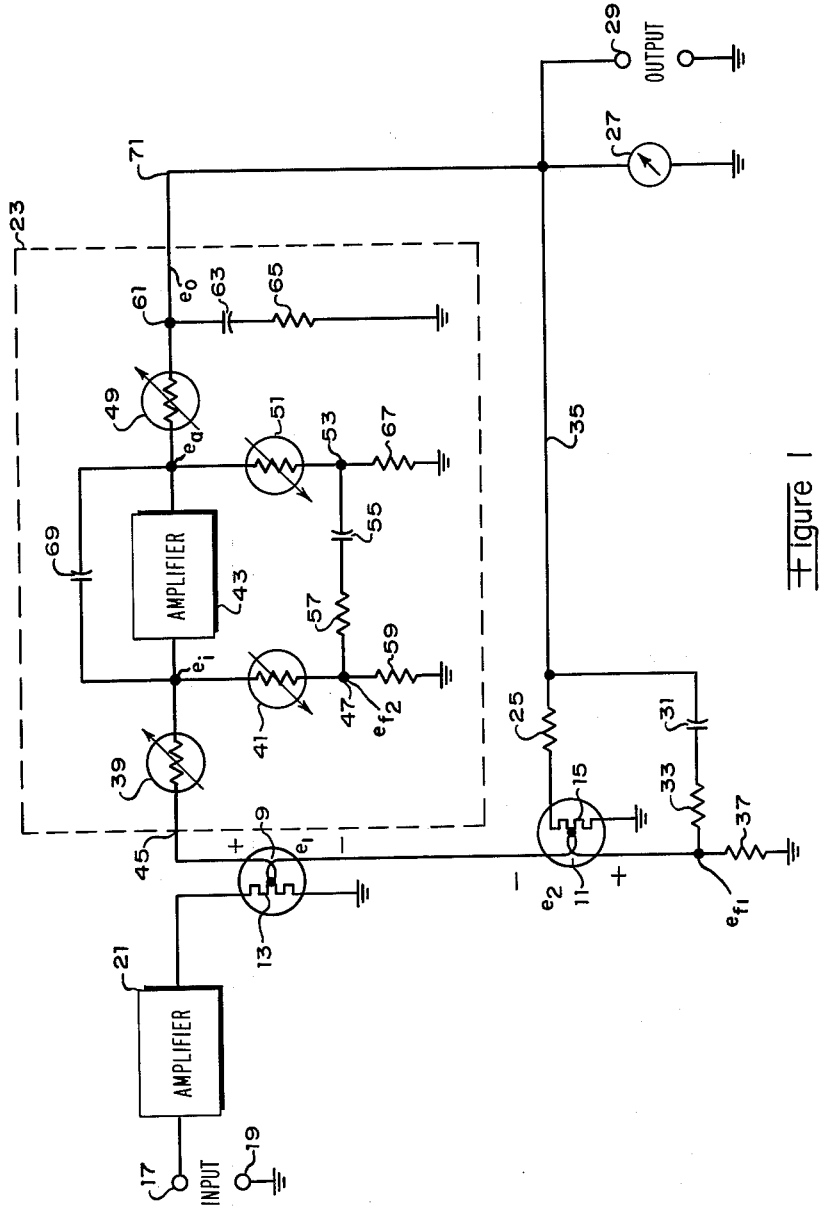
Figure 2:
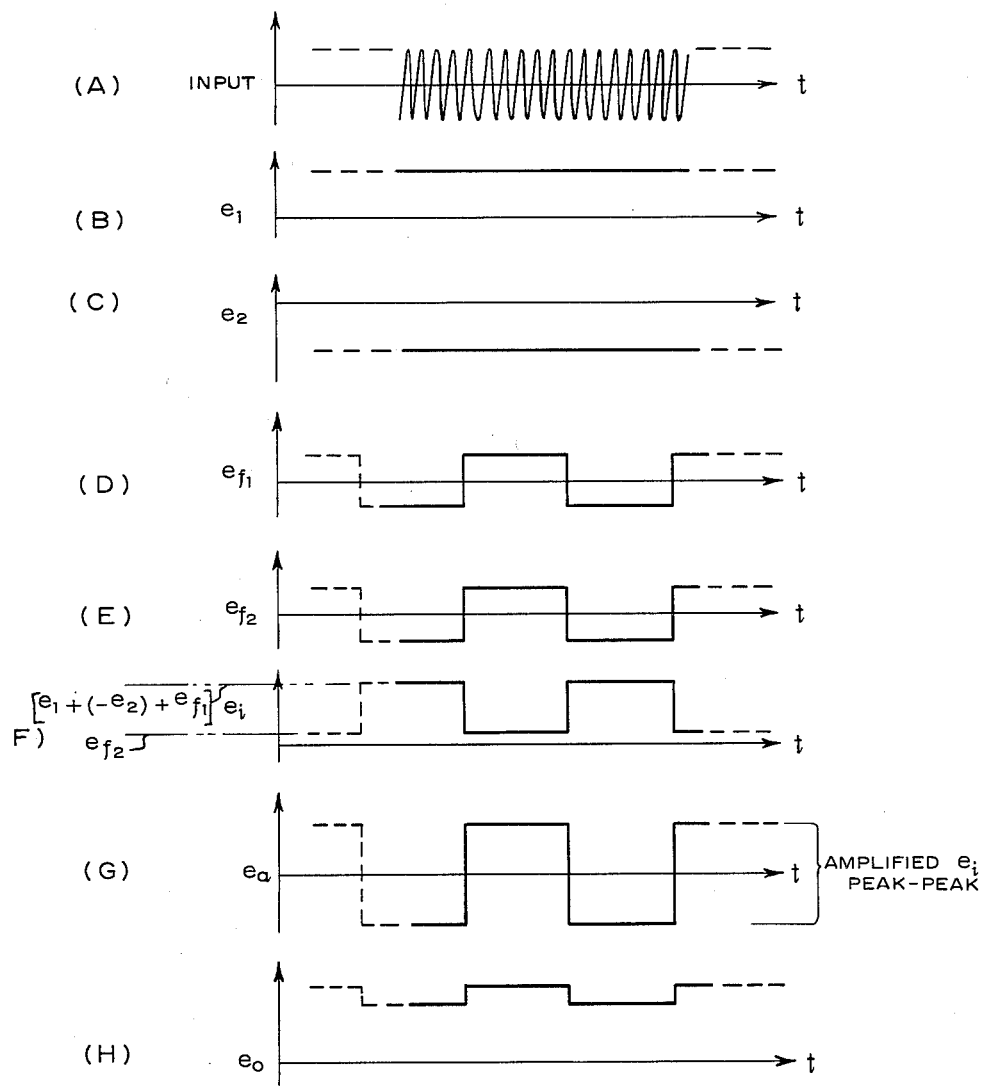

Other and incidental objects of the present invention will be apparent from a reading of this specification and an inspection of the accompanying drawing in which:

FIGURE 1 is a schematic diagram of the voltmeter circuit of the present invention; and FIGURE 2 is a graph of simplified signal waveforms which appear at various connections in the circuit of FIGURE 1.

FIGURE 1 shows a thermocouple 9 having a heater 13 and a thermocouple 11 having a heater 15 connected in series. Applied signal appearing at input terminals 17 and 19 is connected through amplifier 21 to the heater 13 of thermocouple 9. One terminal of the serially connected thermocouples is connected to the input 45 of the D.C. amplifier 23. The output 71 of amplifier 23 is connected to the heater 15 of thermocouple 11 through resistor 25 and is connected to indicating meter 27. A signal divider including serially connected capacitor 31 and resistor 33 connects the output of amplifier 23 and the common terminal of serially connected resistor 37 and thermocouple 11.

The D.C. amplifier 23 includes a pair of switching elements such as photoconductors 39 and 41 which show alternately high and low conductivity in opposite phase relationship and which operate as a modulator. This modulator provides an alternating signal at the input of amplifier 43 which has an amplitude that is equal to the difference between the direct current signals applied to terminals 45 and 47. The amplified signal is applied to the input of the demodulator which includes a pair of switching elements 49 and 51 such as photoconductors which show alternately high and low conductivity in opposite phase relationship. One output terminal 53 of the demodulator is connected to the input terminal 47 of the modulator through a signal divider including serially connected capacitor 55 and resistor 57. The other output terminal of the demodulator 61 is connected to the series circuit including capacitor 63 and resistor 65. A small capacitor 69 is connected between the input and output terminals of the amplifier 43.

General operating description

Referring to FIGURE 2, the waveform under examination (FIGURE 2a) which may be a sine wave, square wave or any complex waveform and which appears at input terminals 17 and 19 is amplified by a wide band amplifier 21 and is applied to the heater 13 of thermocouple 9. Thermocouple 9 thus produces a steady voltage (FIGURE 2b) which is related to the square of the voltage applied to the heater 13. This voltage appears momentarily as an error signal at the input terminal 45 of D.C. amplifier 23. The amplified voltage (FIGURE 2h) appearing at output terminal 71 of the amplifier is applied through resistor 25 to the heater 15 of thermocouple 11 and is also applied to the indicating meter 27. Thermocouple 11 produes a steady voltage (FIGURE 2c) of one polarity which is proportional to the square of the voltage applied to the heater 15. The temperature of the heater 15 increases and the voltage of opposite polarity produced by thermocouple 11 increases until the error signal at input terminal 45 which is equal to the difference between the thermocouple voltages approaches zero. The thermocouples 9 and 11 are selected for equal response time constants. The input-output voltage characteristics for the thermocouples need only be similar, and since the same wire and junctions are used in each, these characteristics are matched to within 0.5 percent. Thus, when the error signal is substantially zero the voltage appearing across heater 15 substantially equals the voltage appearing across heater 13. Also, since the thermocouple voltages are combined in bucking phase relationship, the voltage applied to heater 13 is linearly related to the voltage applied across heater 15, despite the second order relationship between the thermocouple voltage and the heater voltage for each of the units. The indication thus provided by meter 27 is a linear function of the voltage appearing at input terminals 17 and 19. The accuracy of the meter indication is not affected by changes in ambient temperature because a resulting change in the voltage produced by thermocouple 9 is cancelled by a resulting change in the voltage produced by thermocouple 11. One problem encountered due to the thermal mass of thermocouples 9 and 11 and of the respective heaters 13 and 15 is undershoot in the deflection of indicating meter 27 when signal applied to heater 13 is suddenly decreased. In that situation a sudden decrease in the voltage produced by thermocouple 9 results. This produces an error signal which tends to reduce the signal applied to heater 15 and which may cut off D.C. amplifier 23. Signal applied to heater 15 would then only be restored when the D.C. amplifier 23 recovers from cutoff, which recovery occurs when heater 15 undershoots the temperature of the heater 13. This undershooting as indicated by the momentary zero deflection of meter 27 is reduced by the addition of capacitor 31 which discharges through resistor 37. This develops a voltage across resistor 37 which is so applied through the serially connected thermocouples 9 and 11 to the input of D.C. amplifier 23 as to prevent the amplifier from cutting off. Meter 27 thus indicates a monotonic decay in the voltage applied to heater 15 following the reduction of signal applied to heater 13.

*Circuit stability and noise suppression*

Generally, the D.C. amplifier 23 is a chopper-type amplifier and thus it eliminates thermal drift voltages in amplifier 43 from the signal appearing at output terminal 71. This chopper amplifier operates with at least three time-sharing feedback circuits included around the negative gain amplifier 43. A first feedback circuit is provided during one-half cycle of the chopper frequency and includes switching elements 41 and 51 of the modulator and demodulator which are conductive simultaneously and the signal conducting network including capacitor 55 and resistor 57 for providing a feedback signal at junction 47 (FIGURE 2e). A second feedback circuit is provided during alternate half-cycles of the chopper frequency and includes switching elements 39 and 49 of the modulator and demodulator which are conductive simultaneously, the serially connected thermocouples 9 and 11 and the signal conducting network including capacitor 31 and resistor 33 for providing a feedback signal across resistor 37 (FIGURE 2d). The capacitor 63 serves as a D.C. filter capacitor for eliminating demodulation ripple. A small resistor 65 is added in series in order that the time varying component of output signal during the alternate half cycle when elements 39 and 49 are conductive may be passed around the second feedback path. These two feedback circuits which appear during alternate half-cycles of the chopper frequency have the effect of providing operational feedback around the negative gain amplifier 43 (FIGURES 2f and 2g). It is commonly known that an amplifier having a feedback path that includes a vibrating switch which alternately opens and closes at a selected frequency has a transmission characteristic that peaks up at the selected frequency. Thus, the negative gain amplifier 43 and the pair of time-sharing feedback circuits previously described provide extremely high loop gain at the chopper frequency for stability and accuracy while at the same time provide only a narrow pass band through which noise may be transmitted. It is necessary to stabilize the feedback circuits which includes the selective amplifier in order to prevent oscillations. This is accomplished by correcting the phase angle around the loops using the network including capacitor 55, and resistors 67, 57 and 59 in one feedback circuit and the network including capacitor 31 and resistors 15, 25, 33 and 37 in the other feedback circuit. These networks reduce the slope of the skirts on the frequency characteristics of the selective amplifier circuit and provide phase correction near gain crossover. In addition to shaping the phase-gain characteristics around the loop, these two feedback paths also increase the modulator and demodulator efficiencies. This further results in improved signal-to-noise ratio since the signal transmitted through the chopper amplifier is increased while the modulation noise remains substantially constant.

Noise is further reduced by a third feedback circuit including capacitor 69 around amplifier 43. Photoconductors used as the switching elements 39 and 41 change from high resistance values when dark to low resistance values when illuminated with a finite time constant. Thus, during a small interval of time following a transition of each of the photoconductors to the alternate condition of illumination, there is an equivalent high resistance connected to the input of negative gain amplifier 43. As a result, a small capacitor 69 connected to operate as a Miller integrator is highly effective in reducing noise during this transition. Following the transition period, when one of the photoconductors 39 and 41 attains a low resistance value, the resulting noise decreases and the effectiveness of the capacitor 69 as a Miller capacitor is negligible. This third feedback circuit is therefore operable only during the transition period.

Output terminal 29 provides a convenient means for monitoring the voltage appearing across the indicating meter 27 where such voltage is essential for driving a graphic recorder. In applications where a grounded output signal is non-essential, the indicating meter 27 may also be inserted as a current-responsive meter in the feedback line 35.

The present meter circuit thus provides high accuracy indications of the true R.M.S. value of an applied complex waveform. In addition, the present circuit provides a linear relationship between the meter deflection and the effective value of the applied waveform. High signal-to-noise ratios are achieved in the present circuit by providing time-sharing feedback circuits around a chopper amplifier. Further, temperature stability and low thermal drift are realized in the circuit of the present invention.

I claim:

1. An electronic voltmeter comprising first and second elements, each having a heater and each producing a voltage related to the temperature thereof, a first pair of switching elements adapted to be alternately conductive and non-conductive, a second pair of switching elements adapted to be alternately conductive and non-conductive in opposite phase relation to said first pair of switching elements, an amplifier having an input and an output, one switching element in each of said pairs being connected to said input, the other switching element in each of said pairs being connected to said output, means including the first pair of switching elements and forming a first feedback path between the input and output of said amplifier, means including said second pair of switching elements and said first and second elements serially connected in polarity opposition and forming a second feedback path between the input and output of said amplifier, means to apply the signal to be measured to the heater of said first element, means to apply the signal appearing at a point along said second feedback path intermediate said second pair of switching elements to the heater of said second element, and means to derive an indication of said signal to be measured from said point on said second feedback path.

2. An electronic voltmeter comprising first and second thermocouples, each having a heater and each producing a voltage related to the temperature thereof, said thermocouples being serially connected in voltage bucking relationship, a first pair of switching elements adapted to be alternately conductive and non-conductive, a second pair of switching elements adapted to be alternately conductive and non-conductive in opposite phase relation to said first pair of switching elements, an amplifier having an input and an output, one switching element in each of said pairs being connected to said input, the other switching element in each of said pairs being connected to said output, means to apply the signal to be measured to the heater of said first thermocouple, first circuit means including the first pair of switching elements and connecting the input and output of said amplifier, second circuit means including the switching element of said second pair connected to the output of said amplifier and connecting the heater of said second thermocouple and said output, signal conducting means to apply the alternating signal appearing on the heater of said second thermocouple to said serially connected thermocouples, means including the switching element of said second pair connected to said input and connecting said serially connected thermocouples to said input, and means to derive an indication of said signal to be measured from said second circuit means.

3. An electronic voltmeter comprising first and second elements, each having a heater and each producing a voltage related to the temperature thereof, a first pair of photoresponsive elements adapted to be alternately and cyclically illuminated, a second pair of photoresponsive elements adapted to be alternately and cyclically illuminated in opposite phase relation to said first pair of photoresponsive elements, an amplifier having an input and an output, one photoresponsive element in each of said pairs being connected to said input, the other photoresponsive element in each of said pairs being connected to said output, means including the first pair of photoresponsive elements and forming a first feedback loop around said amplifier, means including said second pair of photoresponsive elements and said first and second elements serially connected in polarity opposition and forming a second feedback path around said amplifier, means to apply the signal to be measured to the heater of said first element, means to apply the signal appearing along said second feedback path at a point intermediate said second pair of photoresponsive elements to the heater of said second element, and means to derive an indication of said signal to be measured from said point on said second feedback path.

4. An electronic voltmeter comprising first and second elements, each having a heater and each producing a voltage related to the temperature thereof, a first pair of photoresponsive elements adapted to be alternately and cyclically illuminated, a second pair of photoresponsive elements adapted to be alternately and cyclically illuminated in opposite phase relation to said first pair of photoresponsive elements, an amplifier having an input and an output, one photoresponsive element in each of said pairs being connected to said input, the other photoresponsive element in each of said pairs being connected to said output, means including the first pair of photoresponsive elements and forming a first feedback loop around said amplifier, a resistor, a series circuit including said second pair of photoresponsive elements, said resistor and said first and second elements connected in polarity opposition and forming a second feedback path around said amplifier, capacitive means forming a third feedback path around said amplifier, means to apply a signal to be measured to the heater of said first element, means to apply the signal appearing along said second feedback path at a point intermediate said second pair of photoresponsive elements to the heater of said second element, means connected to said point along the second feedback path for producing a damping signal having an amplitude related to the rate of change of signal applied to the heater of said second element and for applying said damping signal to said resistor, and means to derive an indication of said signal to be measured from said point on said second feedback path.

References Cited by the Examiner
UNITED STATES PATENTS 2,857,569  10/1958  Gilbert et al. _____ 324—106
3,093,732  6/1963  Clark _____ 324—106 X

OTHER REFERENCES

Hewlett-Packard Journal, vol. 14, No. 9, May-June, 1963, page 3.

WALTER L. CARLSON, *Primary Examiner.*

C. F. DUFFIELD, G. L. LETT, *Assistant Examiners.*